United States Patent
Ryu et al.

(10) Patent No.: US 10,412,339 B2
(45) Date of Patent: Sep. 10, 2019

(54) ELECTRONIC DEVICE AND IMAGE ENCODING METHOD OF ELECTRONIC DEVICE

(71) Applicant: Samsung Electronics Co., Ltd., Suwon-si, Gyeonggi-do (KR)

(72) Inventors: Jang Hee Ryu, Seoul (KR); Jung Won Lee, Incheon (KR); Bong Soo Jung, Suwon-si (KR); Woong Il Choi, Osan-si (KR); Kwang Pyo Choi, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 20 days.

(21) Appl. No.: 15/234,577

(22) Filed: Aug. 11, 2016

(65) Prior Publication Data
US 2017/0048481 A1 Feb. 16, 2017

(30) Foreign Application Priority Data
Aug. 11, 2015 (KR) .................. 10-2015-0113125

(51) Int. Cl.
*H04N 5/917* (2006.01)
*H04N 19/172* (2014.01)
(Continued)

(52) U.S. Cl.
CPC ............. *H04N 5/917* (2013.01); *H04N 5/77* (2013.01); *H04N 19/10* (2014.11);
(Continued)

(58) Field of Classification Search
USPC ............... 348/92, 262; 358/403; 375/240.16
See application file for complete search history.

(56) References Cited

U.S. PATENT DOCUMENTS

| | | | |
|---|---|---|---|
| 6,442,573 B1 * | 8/2002 | Schiller | .................. H04L 29/06 358/403 |
| 6,560,282 B2 | 5/2003 | Tahara et al. | |

(Continued)

FOREIGN PATENT DOCUMENTS

| | | |
|---|---|---|
| CN | 1241095 A | 1/2000 |
| CN | 1567375 A | 1/2005 |

(Continued)

OTHER PUBLICATIONS

European Office Action dated May 18, 2018, issued in the European Application No. 16183840.4.

(Continued)

*Primary Examiner* — Xuemei G Chen
(74) *Attorney, Agent, or Firm* — Jefferson IP Law, LLP

(57) ABSTRACT

An electronic device is provided. The electronic device includes a camera configured to obtain an image, an input buffer configured to store the image, an encoder implemented with hardware, and configured to encode an image output from the input buffer, at least one memory, and a processor configured to electrically connect with the camera, the input buffer, the encoder, and the at least one memory. The processor is configured to generate an encoding parameter based on a characteristic of the encoder receiving the encoding parameter and to provide the encoding parameter to the encoder.

15 Claims, 9 Drawing Sheets

(51) Int. Cl.
*H04N 19/10* (2014.01)
*H04N 19/136* (2014.01)
*H04N 19/146* (2014.01)
*H04N 19/156* (2014.01)
*H04N 19/17* (2014.01)
*H04N 5/77* (2006.01)

(52) U.S. Cl.
CPC ......... *H04N 19/136* (2014.11); *H04N 19/146* (2014.11); *H04N 19/156* (2014.11); *H04N 19/17* (2014.11); *H04N 19/172* (2014.11)

(56) References Cited

U.S. PATENT DOCUMENTS

| | | | |
|---|---|---|---|
| 6,597,860 | B2 | 7/2003 | Song et al. |
| 7,469,007 | B2 | 12/2008 | Tahara et al. |
| 7,933,473 | B2 * | 4/2011 | Gerhard ............... H04N 19/162 382/299 |
| 8,023,749 | B2 | 9/2011 | Nakayama |
| 8,638,849 | B2 | 1/2014 | Tahara et al. |
| 8,687,690 | B2 | 4/2014 | Tahara et al. |
| 8,824,546 | B2 | 9/2014 | Coulombe et al. |
| 8,934,536 | B2 | 1/2015 | Tahara et al. |
| 8,938,000 | B2 | 1/2015 | Tahara et al. |
| 8,948,251 | B2 | 2/2015 | Tahara et al. |
| 8,982,946 | B2 | 3/2015 | Tahara et al. |
| 9,049,442 | B2 * | 6/2015 | Sakamoto ............ H04N 19/15 |
| 9,715,903 | B2 * | 7/2017 | Gupte ................ G11B 27/3081 |
| 2002/0057902 | A1 | 5/2002 | Song et al. |
| 2003/0016755 | A1 | 1/2003 | Tahara et al. |
| 2003/0128766 | A1 | 7/2003 | Tahara et al. |
| 2003/0222998 | A1 * | 12/2003 | Yamauchi ............ G06T 3/4015 348/262 |
| 2006/0204115 | A1 | 9/2006 | Burazerovic |
| 2007/0110158 | A1 * | 5/2007 | Maeda ................ H04N 19/139 375/240.16 |
| 2007/0126908 | A1 * | 6/2007 | Kim ................... H04N 1/00307 348/333.01 |
| 2007/0206868 | A1 | 9/2007 | Nakayama |
| 2007/0263719 | A1 | 11/2007 | Tahara et al. |
| 2007/0292036 | A1 | 12/2007 | Nakayama |
| 2008/0008237 | A1 | 1/2008 | Tahara et al. |
| 2008/0013625 | A1 | 1/2008 | Tahara et al. |
| 2008/0013626 | A1 | 1/2008 | Tahara et al. |
| 2008/0013627 | A1 | 1/2008 | Tahara et al. |
| 2008/0232464 | A1 | 9/2008 | Tahara et al. |
| 2010/0195713 | A1 | 8/2010 | Coulombe et al. |
| 2013/0050469 | A1 * | 2/2013 | Takezawa ............ G06T 7/0004 348/92 |
| 2013/0271621 | A1 * | 10/2013 | Lee ........................ H04N 5/225 348/222.1 |
| 2013/0286250 | A1 * | 10/2013 | Kumar ................. H04N 5/232 348/231.99 |
| 2014/0198233 | A1 * | 7/2014 | Choi ................... H04N 1/2112 348/231.3 |
| 2014/0267842 | A1 * | 9/2014 | Lee .......................... G06F 3/14 348/262 |
| 2014/0294098 | A1 | 10/2014 | Saito |
| 2015/0181208 | A1 | 6/2015 | Park et al. |
| 2016/0007024 | A1 | 1/2016 | Park et al. |

FOREIGN PATENT DOCUMENTS

| | | |
|---|---|---|
| CN | 1757240 A | 4/2006 |
| CN | 101325624 A | 12/2008 |
| WO | 99/09748 A1 | 2/1999 |
| WO | 2008/154742 A1 | 12/2008 |

OTHER PUBLICATIONS

Chinese Office Action dated Jul. 4, 2018, issued in the Chinese Application No. 201610657410.2.

* cited by examiner

ELECTRONIC DEVICE AND IMAGE ENCODING METHOD OF ELECTRONIC DEVICE

CROSS-REFERENCE TO RELATED APPLICATION(S)

This application claims the benefit under 35 U.S.C. § 119(a) of a Korean patent application filed on Aug. 11, 2015 in the Korean Intellectual Property Office and assigned Serial number 10-2015-0113125, the entire disclosure of which is hereby incorporated by reference.

TECHNICAL FIELD

The present disclosure relates to technologies for encoding images.

BACKGROUND

With the development of electronic technologies, various types of electronic devices have been developed and distributed. Particularly, recently, electronic devices, such as smartphones and tablet personal computers (PCs), having various functions, have come into wide use.

The above-mentioned electronic device includes a camera module which may usually capture images. Therefore, a user of the electronic device may capture an image using the electronic device, may store or edit the captured image, and may send the stored or edited image to another terminal. The image captured through the camera module of the electronic device may be encoded and may then be stored in a memory of the electronic device. The encoding of the image may be performed through hardware or software.

If encoding is performed through an encoder implemented with hardware, the encoder encodes all images using the same encoding parameter. In other words, the encoder may not perform encoding in consideration of characteristics of the electronic device and characteristics of images. Therefore, it may be difficult to compress all images at a high compressibility.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a method for generating an encoding parameter based on a characteristic of the electronic device or a characteristic of an image and encoding the image by an encoder, implemented with hardware, using the generated encoding parameter.

In accordance with an aspect of the present disclosure, an electronic device is provided. The electronic device includes a camera configured to obtain an image, an input buffer configured to store the image, an encoder implemented with hardware, and configured to encode an image output from the input buffer, at least one memory, and a processor configured to electrically connect with the camera, the input buffer, the encoder, and the at least one memory. The processor is configured to generate an encoding parameter based on a characteristic of the encoder receiving the encoding parameter and to provide the encoding parameter to the encoder.

In accordance with another aspect of the present disclosure, an electronic device is provided. The electronic device includes a camera configured to obtain an image, a processor configured to include an input buffer configured to store the image, and an encoder implemented with hardware, and configured to encode an image output from the input buffer. The processor is configured to generate an encoding parameter based on a characteristic of the encoder receiving the encoding parameter and to provide the encoding parameter to the encoder.

In accordance with another aspect of the present disclosure, a method is provided. The method includes generating an encoding parameter based on a characteristic of an encoder implemented with hardware receiving the encoding parameter and providing the encoding parameter to the encoder.

In accordance with another aspect of the present disclosure, a non-transitory computer-readable recording medium is provided. The non-transitory computer-readable recording medium includes instructions set to generate an encoding parameter based on a characteristic of an encoder implemented with hardware, configured to receive the encoding parameter and to provide the encoding parameter to the encoder.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
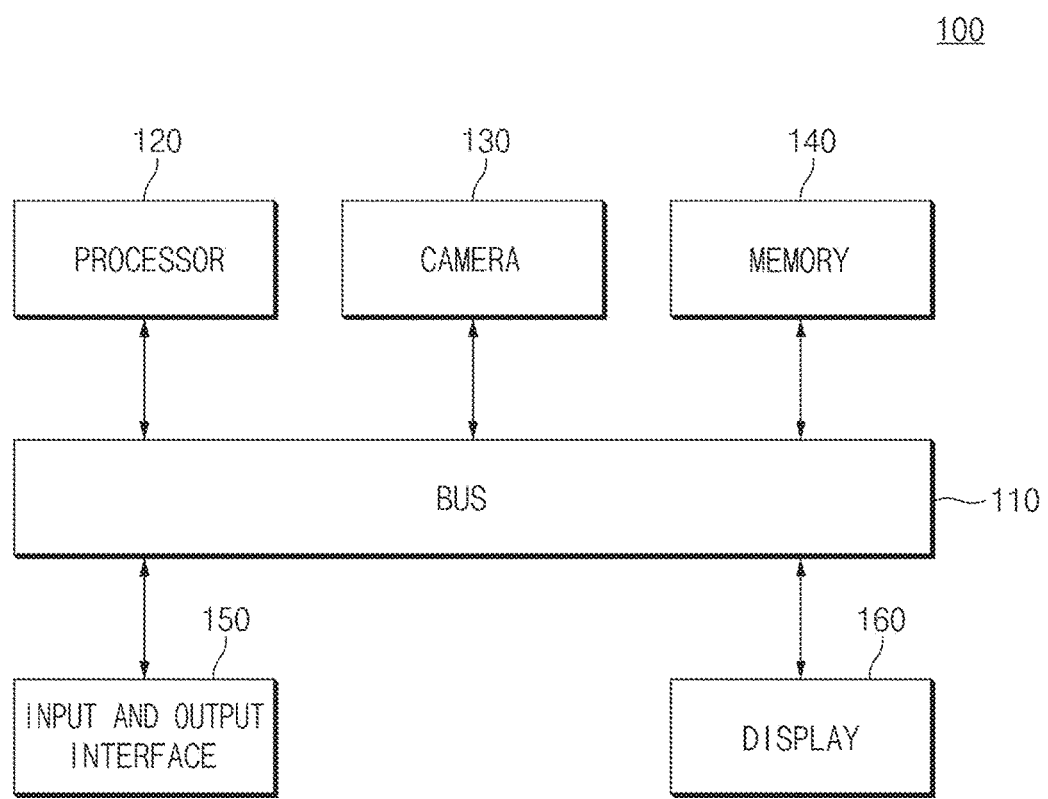
FIG. 1 is a block diagram illustrating a configuration of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of the well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The expressions such as "1st", "2nd", "first", or "second", and the like used in various embodiments of the present disclosure may refer to various elements irrespective of the order and/or priority of the corresponding elements, but do not limit the corresponding elements. The expressions may be used to distinguish one element from another element. For instance, both "a first user device" and "a second user device" indicate different user devices from each other irrespective of the order and/or priority of the corresponding elements. For example, a first component may be referred to as a second component and vice versa without departing from the scope of the present disclosure.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening elements (e.g., a third element).

Depending on the situation, the expression "configured to" used herein may be used as, for example, the expression "suitable for", "having the capacity to", "designed to", "adapted to", "made to", or "capable of". The term "configured to" must not mean only "specifically designed to" hardwarily. Instead, the expression "a device configured to" may mean that the device is "capable of" operating together with another device or other components. For example, a "processor configured to perform A, B, and C" may mean a generic-purpose processor (e.g., a central processing unit (CPU) or an application processor (AP)) which may perform corresponding operations by executing one or more software programs which are stored ma memory device, or a dedicated processor (e.g., an embedded processor) for performing a corresponding operation.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal meanings unless expressly so defined herein in various embodiments of the present disclosure. In some cases, even if terms are terms which are defined in the specification, they may not be interpreted to exclude embodiments of the present disclosure.

Electronic devices according to various embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Moving Picture Experts Group phase 1 or phase 2 (MPEG-1 or MPEG-2) audio layer 3 (MP3) players, mobile medical devices, cameras, or wearable devices.

According to various embodiments, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

In various embodiments, the electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

In various embodiments, the electronic devices may include at least one of various medical devices (e.g., various portable medical measurement devices (e.g., blood glucose meters, heart rate meters, blood pressure meters, or thermometers, and the like), a magnetic resonance angiography (MRA), a magnetic resonance imaging (MRI), a computed tomography (CT), scanners, or ultrasonic devices, and the like), navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments, the electronic devices may include at least one of parts of furniture or buildings/structures, electronic boards, electronic signature receiving devices, projectors, or various measuring instruments (e.g., water meters, electricity meters, gas meters, or wave meters, and the like). The electronic devices according to various embodiments of the present disclosure may be one or more combinations of the above-mentioned devices. The electronic devices according to various embodiments of the present disclosure may be flexible electronic devices. Also, electronic devices according to various embodiments of the present disclosure are not limited to the above-mentioned devices, and may include new electronic devices according to technology development Hereinafter, electronic devices according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 is a block diagram illustrating a configuration of an electronic device according to an embodiment of the present disclosure.

Referring to FIG. 1, an electronic device 100 according to an embodiment of the present disclosure may include, for example, a bus 110, a processor 120, a camera module 130, a memory 140, an input and output interface 150, and a display 160. In various embodiments, at least one of the components of the electronic device 100 may be omitted from the electronic device 100, or another component may be additionally included in the electronic device 100.

The electronic device 100 may encode an image captured by the electronic device 100. The electronic device 100 may generate an encoding parameter for encoding the image based on a characteristic of the image captured by the camera module 130, a characteristic of an encoder implemented with hardware, or a requested processing speed and the like, and may encode the image.

The bus 110 may connect the processor 120, the camera module 130, the memory 140, the input and output interface 150, and the display 160 with each other.

The processor 120 may generate an encoding parameter for encoding the image obtained by the camera module 130. The processor 120 may provide the generated encoding parameter to an encoder (not shown). The encoding parameter may be, for example, one of various parameters, such as a quality factor, a quantization table, or a quantization parameter, used for performing encoding.

According to an embodiment, the processor 120 may generate an encoding parameter based on a characteristic of the encoder. The encoder may be implemented with hardware. According to an embodiment, the processor 120 may generate an encoding parameter based on an image obtained by the camera module 130.

According to an embodiment, the processor 120 may calculate an encoding parameter based on an image temporarily stored in an input buffer (not shown) or the memory 140. The processor 120 may provide the encoding parameter to the encoder to encode an image. The processor 120 may store an image in the memory 140. The processor 120 may calculate an encoding parameter, may encode an image, and may store the image in the memory 140 by executing instructions stored in the memory 140.

According to an embodiment, the processor 120 may resize or crop an image to reduce a data size of the image.

According to an embodiment, the processor 120 may analyze an image based on a visual recognition model. The visual recognition model may be luminance masking which is a visual characteristic model for a brightness difference of an image or contrast masking which is a visual characteristic model for a variation level of a pixel value of an image. The processor 120 may calculate, for example, an analyzed result, such as a mean brightness value for an image, a brightness histogram for the image, a color difference histogram for the image, or frequency component information for the image, by analyzing the image.

According to an embodiment, the processor 120 may determine an operation environment of the camera module 130 and may generate an encoding parameter based on the operation environment. For one example, if the encoding parameter is a quality factor, the processor 120 may generate a quality factor having a small value in an operation environment where a high compressibility is requested and may generate a quality factor having a large value in an operation environment where a high quality is requested. For another example, if the encoding parameter is a quantization table, the processor 120 may generate a quantization table with a low magnitude of each of values in the quantization table in an operation environment where a high compressibility is requested and may generate a quantization table with a low magnitude of each of values in the quantization table in an operation environment where a high quality is requested. For another example, if the encoding parameter is a quantization table, the processor 120 may generate a quantization parameter having a large value in an operation environment where a high compressibility is requested and may generate a quantization table having a small value in an operation environment where a high quality is requested.

According to an embodiment, the processor 120 may extract an encoding parameter from a previously stored encoding parameter set. For example, the processor 120 may determine an encoding parameter from an encoding parameter set stored in the memory 140 based on an analyzed result or an operation environment of the camera module 130.

The camera module 130 may obtain an image by recording light received from an object. According to an embodiment, the camera module 130 may obtain an image in response to a capture command input through the input and output interface 150.

According to an embodiment, the camera module 130 may provide an image to the processor 120 in response to a capture command input through the input and output interface 150.

The memory 140 may store data generated or processed by the processor 120 and the camera module 130. According to an embodiment, the memory 140 may store an encoding parameter generated by the processor 120. According to an embodiment, the memory 140 may store an image obtained by the camera module 130. According to an embodiment, an encoding parameter set may be previously stored in the memory 140. According to an embodiment, the memory 140 may store an encoded image. According to an embodiment, the memory 140 may store instructions for, when executed, causing the processor 120 to calculate an encoding parameter based on an image temporarily stored in an input buffer or the memory 140, to provide the encoding parameter to an encoder to encode the image, and to store the image in the memory 140.

The input and output interface 150 may receive a command from a user of the electronic device 100 and may send the received command to the processor 120, the camera module 130, the memory 140, or the display 160. For example, if the camera module 130 is activated, the input and output interface 150 may receive a capture command from the user and may send the received capture command to the processor 120 or the camera module 130.

The display 160 may output an image obtained by the camera module 130. In an embodiment, if the camera module 130 is activated, the display 160 may output an image, obtained by the camera module 130, in real time. The display 160 may output a user interface (UI) for receiving a capture command.

Figure 2:
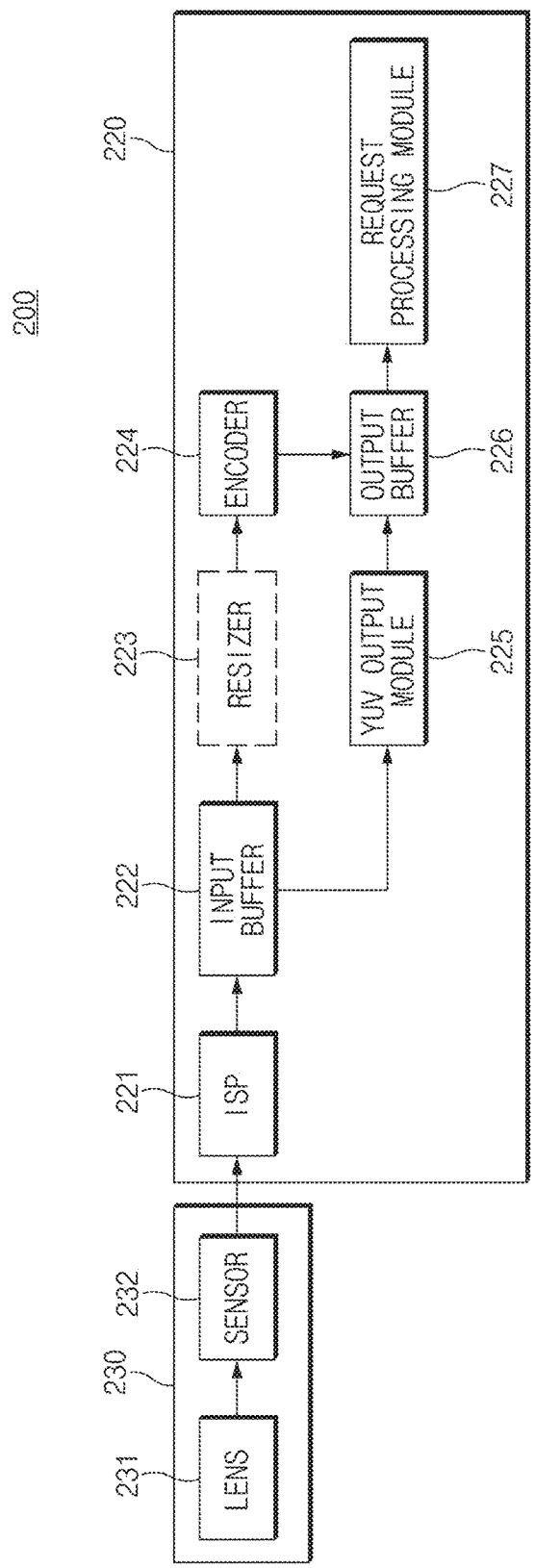
FIG. 2 is a block diagram illustrating a configuration of an electronic device according to an embodiment of the present disclosure.

FIG. 2 is a block diagram illustrating a configuration of an electronic device according to an embodiment of the present disclosure. For convenience of description, a repeated description for components described with reference to FIG. 1 will be omitted below.

Referring to FIG. 2, an electronic device 100 according to an embodiment of the present disclosure may include, for example, a processor 220 and a camera module 230.

The camera module 230 may include, for example, a lens 231 and a sensor 232.

The lens 231 may refract light incident from an object to be sensed by the sensor 232.

The sensor 232 may sense light incident through the lens 231 to generate an original image. In this specification, the original image may be data generated after light is sensed by the sensor 232 and may refer to data of a state where it is not processed by another component. Image quality of the original image may be determined based on a size of the sensor 232.

The processor 220 (e.g., an AP) may be implemented with a system on chip (SoC) including a CPU, a graphics processing unit (GPU), a video processor, a memory, and the like. The processor 220 may include, for example, an image signal processor (ISP) 221, an input buffer 222, a resizer 223, an encoder 224, a luminance and chrominance (YUV) output module 225, an output buffer 226, and a request processing module 227.

The ISP 221 may generate a capture image by processing an original image generated by the sensor 232 of the camera module 230. In this specification, the capture image may be an image in a state where it is processed by the ISP 221 and may be an image which is output as a preview image through the YUV output module 225 or is encoded by the encoder 224.

The input buffer 222 may store the capture image generated by the ISP 221. The input buffer 222 may be a memory for temporarily storing the capture image (or a first image). The input buffer 222 may store and output the capture image in a first-in, first-out (FIFO) manner. According to an embodiment, the capture image stored in the input buffer 222 may be sent to the encoder 224, the YUV output module 225 or another component of the processor 220. According to an embodiment, the capture image sent from the input buffer 222 to another component of the processor 220 may be analyzed by the processor 220. According to an embodiment, the capture image sent from the input buffer 222 to the encoder 224 may be encoded based on an encoding parameter.

The resizer 223 may resize the capture image. For example, the resizer 223 may resize an image to a size of ½, ¼, or ⅛. According to an embodiment, the resizer 223 may be implemented with hardware. If the resizer 223 is implemented with hardware, a time required for resizing the image may be shortened. The processor 220 may control the resizer 223 to resize an image. The resizer 223 may receive an image from the input buffer 222 and may resize the received image. The resizer 223 may send the resized image to the encoder 224.

According to an embodiment, the processor 220 may resize an image to reduce a data size of the image, based on system resource information of the electronic device 200 (e.g., performance of the processor 220 or information indicating whether the electronic device 200 includes the resizer 223), feature information (e.g., resolution or a region of interest (ROI)) of the image, or specific capture quality information. For example, if the performance of the processor 220 is lower than a specific condition, since a time required for analyzing the image is increased, the processor 220 may control the resizer 223 to resize the image to be smaller. For another example, if resolution of the image is higher than a specific condition, since a time required for analyzing the image is increased, the processor 220 may control the resizer 223 to resize the image to be smaller. For another example, if specific capture quality is low, since it is not required to analyze the image in a detailed manner, the processor 220 may control the resizer 223 to resize the image to be smaller.

The encoder 224 may encode the capture image sent from the input buffer 222. According to an embodiment, the encoder 224 may be implemented with hardware. According to an embodiment, the encoder 224 may encode the capture image based on the encoding parameter generated by the processor 220. According to an embodiment, the encoder 224 may access a memory which stores an encoding parameter to obtain the encoding parameter. According to an embodiment, a time required for performing encoding may vary based on a structure of an encoding parameter used by the encoder 224. The structure of the encoding parameter may be, for example, a zigzag scan code structure, a one-dimensional (1D) structure, or a two-dimensional (2D) structure. The image encoded by the encoder 224 may have a different compressibility based on a level of an encoding parameter value.

The YUV output module 225 may convert the capture image, sent from the input buffer 222, into a YUV format and may output the converted image. The image output from the YUV output module 225 may be a preview image (or a second image). In this specification, the preview image may be an image provided to a display (not shown) if the camera module 230 is activated. The preview image may be an image to show the user an image to be captured through the camera module 230 in advance if a capture command is received. A time difference between the preview image and the capture image may be present. The preview image may be smaller in data size than the capture image to be easily output in real time using the display.

The output buffer 226 may receive and store an image from the encoder 224 or the YUV output module 225. According to an embodiment, the output buffer 226 may store the preview image received from the YUV output module 225. The output buffer 226 may send the preview image to the display or another component of the processor 220. According to an embodiment, the output buffer 226 may store an encoded capture image received from the encoder 224. The output buffer 226 may send the encoded capture image to a memory (not shown).

The request processing module 227 may perform processing requested by another component. According to an embodiment, if a preview image stored in the output buffer 226 is requested by the processor 220, the request processing module 227 may send the preview image to the display or another component of the processor 220. According to an embodiment, the request processing module 227 may send the capture image encoded by the encoder 224 to the memory.

As shown in FIG. 2, the input buffer 222, the resizer 223, the encoder 224, the YUV output module 225, the output buffer 226, and the request processing module 227 may be implemented as part of the processor 220. However, embodiments of the present disclosure are not limited thereto. For example, at least some of the input buffer 222, the resizer 223, the encoder 224, the YUV output module 225, the output buffer 226, and the request processing module 227 may be implemented as separate modules or part of the camera module 230.

According to an embodiment, an electronic device may include a camera module configured to obtain an image, an input buffer configured to store the image, an encoder implemented with hardware to encode an image output from the input buffer, at least one memory, and a processor configured to electrically connect with the camera module, the input buffer, the encoder, and the at least one memory. The processor may be configured to generate an encoding parameter based on a characteristic of the encoder receiving the encoding parameter and to provide the encoding parameter to the encoder.

According to an embodiment, the memory may store instructions for, when executed, causing the processor to calculate the encoding parameter based on an image temporarily stored in the input buffer or the at least one memory, to provide the encoding parameter to the encoder, and to store an image encoded by the encoder in the at least one memory.

According to an embodiment, the processor may include the encoder.

According to an embodiment, the processor may be configured to generate the encoding parameter based on an image to be analyzed, obtained by the camera module, in response to a capture command.

According to an embodiment, the at least one memory may include a non-volatile memory and a volatile memory. The image to be analyzed may be data which is stored in the volatile memory without being stored in the non-volatile memory.

According to an embodiment, the electronic device may further include a display and an output buffer configured to store an image to be output on the display. The image to be analyzed may be an image stored in the output buffer.

According to an embodiment, the processor may be configured to determine an image, stored in the input buffer at a time when a capture command for the camera module is received, as the image to be analyzed.

According to an embodiment, the processor may be configured to collect system resource information about the electronic device and to determine the image to be analyzed, among images obtained by the camera module, based on the system resource information.

According to an embodiment, the electronic device may further include a display and an output buffer configured to store an image to be output on the display. The processor may be configured to determine the image to be analyzed, among images obtained by the camera module, based on similarity between an image stored in the output buffer and an image stored in the input buffer.

According to an embodiment, the processor may be configured to collect system resource information of the electronic device and to resize or crop the image to be analyzed to reduce a data size of the image to be analyzed, based on the system resource information.

According to an embodiment, the processor may be configured to resize or crop the image to be analyzed to reduce a data size of the image to be analyzed, based on feature information of the image to be analyzed.

According to an embodiment, the processor may be configured to resize or crop the image to be analyzed to reduce a data size of the image to be analyzed, based on specific capture quality information.

According to an embodiment, the processor may be configured to generate the encoding parameter based on an operation environment of the camera module.

According to an embodiment, the processor may be configured to analyze the image to be analyzed, based on a previously stored visual recognition model.

According to an embodiment, the processor may be configured to calculate a value of the encoding parameter based on the analyzed result and to determine a structure of the encoding parameter based on a characteristic of the encoder receiving the encoding parameter.

According to an embodiment, the processor may be configured to determine a value of the encoding parameter from a previously stored encoding parameter set based on the analyzed result.

According to an embodiment, if the processor includes a plurality of cores, the processor may be configured to divide the image to be analyzed and to simultaneously analyze the divided images to be analyzed using the plurality of cores.

According to an embodiment, an electronic device may include a camera module configured to obtain an image and a processor configured to include an input buffer configured to store the image and an encoder implemented with hardware to encode an image output from the input buffer. The processor may be configured to generate an encoding parameter based on a characteristic of the encoder receiving the encoding parameter and to provide the encoding parameter to the encoder.

According to an embodiment, the processor may be configured to generate the encoding parameter based on an image to be analyzed, obtained by the camera module, in response to a capture command.

According to an embodiment, the electronic device may further include a display. The processor may further include an output buffer configured to store an image to be output on the display. The processor may be configured to determine an image, stored in the output buffer at a time when a capture command for the camera module is received, as the image to be analyzed.

Figure 3:
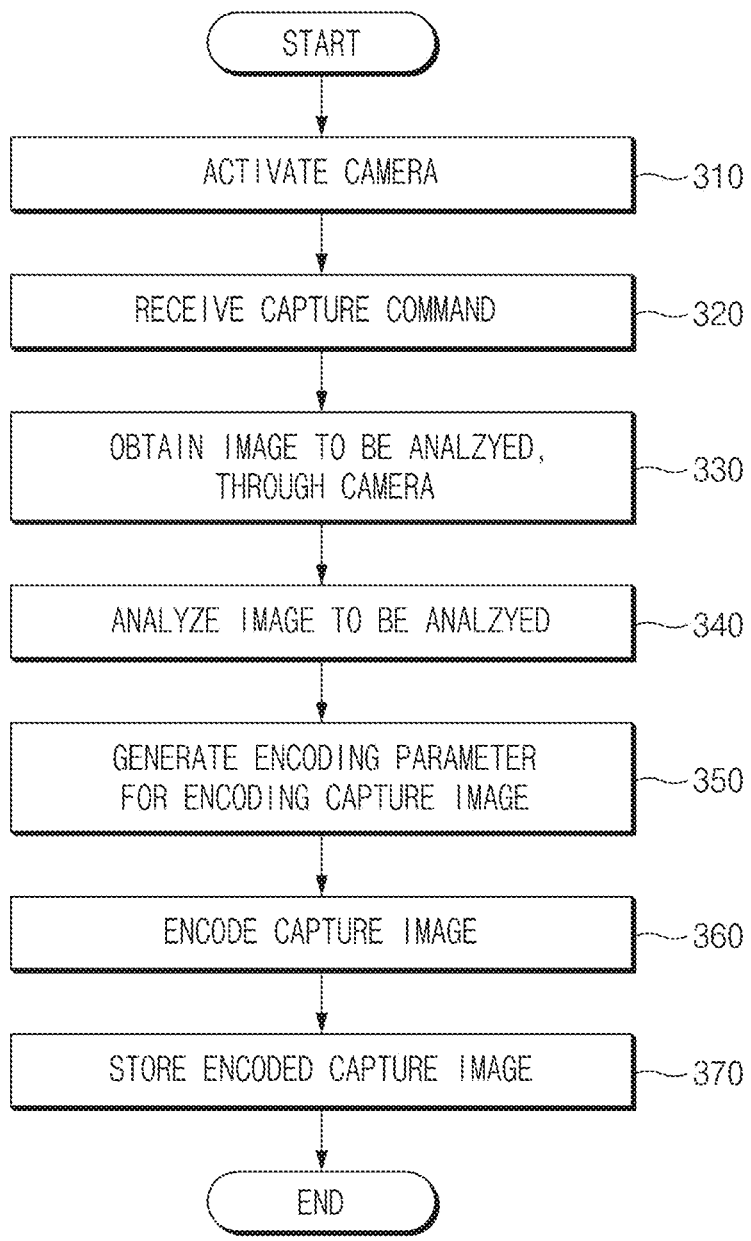
FIG. 3 is a flowchart illustrating an image encoding method of an electronic device according to an embodiment of the present disclosure.

FIG. 3 is a flowchart illustrating an image encoding operation method of an electronic device according to an embodiment of the present disclosure.

Operations shown in FIGS. 3 to 6 may include operations processed in an electronic device 100 shown in FIG. 1 or operations processed in an electronic device 200 shown in FIG. 2. Therefore, although there are contents omitted below, contents described about the electronic device 100 or the electronic device 200 with reference to FIG. 1 or 2 may be applied to the operations shown in FIGS. 3 to 6.

Referring to FIG. 3, in operation 310, the electronic device 100 may activate a camera module 130 of FIG. 1. Operation 310 may be performed in various environments.

For one example, operation 310 may be performed if a user of the electronic device 100 executes an image capture application installed in the electronic device 100. For another example, operation 310 may be performed if the user activates the camera module 130 through another application such as a social networking service (SNS) application or a messenger application.

In operation 320, the electronic device 100 may receive a capture command. For one example, operation 320 may be performed if a user input on a capture button occurs after the camera module 130 is activated. For another example, operation 320 may be performed if a specific condition is met, for example if a face of a person is recognized from an image generated by the camera module 130 or if a time set by the user arrives, after the camera module 130 is activated.

In operation 330, the electronic device 100 may obtain an image to be analyzed. In this specification, the image to be analyzed may be an image analyzed by the electronic device 100 to generate an encoding parameter. The image to be analyzed may be obtained by performing specific processing for an original image obtained by the camera module 130. According to an embodiment, the image to be analyzed may be stored in a volatile memory, such as a random access memory (RAM), an input buffer, or an output buffer, without being stored in a non-volatile memory.

According to an embodiment, the electronic device 100 may select a capture image (or a first image) stored in an input buffer or a preview image (or a second image) stored in an output buffer as the image to be analyzed. Hereinafter, a description will be given in detail of an operation of determining the image to be analyzed with reference to FIG. 4.

In operation 340, the electronic device 100 may analyze the image to be analyzed. According to an embodiment, the electronic device 100 may analyze the image to be analyzed, based on a visual recognition model. The visual recognition model may be a model previously stored in the memory 140. For example, the electronic device 100 may calculate an analyzed result, such as a mean brightness value for the image to be analyzed, a brightness histogram for the image to be analyzed, a color difference histogram for the image to be analyzed, or frequency component information for the image to be analyzed, by analyzing the image to be analyzed using the visual recognition model such as luminance masking or contrast masking.

According to an embodiment, if the processor 120 includes two or more cores or if the processor 120 includes a plurality of processors, the electronic device 100 may analyze the image to be analyzed, in parallel. For example, if the processor 120 includes two cores, the electronic device 100 may divide the image to be analyzed into two regions and may simultaneously analyze the divided two regions using the two cores. Also, the plurality of processors may be homogeneous processors (e.g., a first CPU and a second CPU) or may be heterogeneous processors (e.g., a CPU and a GPU).

In operation 350, the electronic device 100 may generate an encoding parameter for encoding a capture image.

According to an embodiment, the electronic device 100 may calculate the encoding parameter based on the result analyzed in operation 340. For example, it is determined that the loss of an image is unnoticed although a capture image is encoded at a high compressibility based on the analyzed result, the electronic device 100 may calculate an encoding parameter for providing the high compressibility. Also, if it is determined that the loss of the image is noticed if the capture image is encoded at the high compressibility based on the analyzed result, the electronic device 100 may calculate an encoding parameter for providing a low compressibility. If the encoding parameter is a quantization parameter and if a value of the encoding parameter is high, compressibility for the capture image may be decreased and loss by encoding may be reduced. If the encoding parameter is the quantization parameter and if the value of the encoding parameter is low, the compressibility for the capture image may be increased and the loss by encoding may be increased.

According to an embodiment, the electronic device 100 may determine a characteristic of an encoder receiving an encoding parameter and may generate the encoding parameter based on the characteristic of the encoder. For one example, if the encoder is implemented to receive an encoding parameter of a zigzag scan code structure, the electronic device 100 may assign the encoding parameter to the memory 140 in an order of zigzag scan codes. For another example, if the encoder is implemented to sequentially receive encoding parameters of a 1D structure, the electronic device 100 may assign the encoding parameters to the memory 140 in the 1D structure. For another example, if the encoder is implemented to sequentially receive encoding parameters of a 2D structure, the electronic device 100 may assign the encoding parameters to the memory 140 in the 2D structure. In other words, the electronic device 100 may generate an encoding parameter as a structure requested by the encoder having any characteristic of the encoder and may provide the generated encoding parameter to the encoder.

According to an embodiment, the electronic device 100 may determine an encoding parameter to be applied to a capture image, from a previously stored encoding parameter set. For example, the electronic device 100 may select an encoding parameter, corresponding to the result analyzed in operation 340 or a characteristic of the encoder receiving the encoding parameter, from the previously stored encoding parameter set.

Operations 330 to 350 may be performed after the processor 120 executes a software module for performing operations 330 to 350.

In operation 360, the electronic device 100 may encode the capture image based on the encoding parameter. Operation 360 may be performed by the encoder implemented with hardware in the electronic device 100. For example, if the encoding parameter is assigned to the memory 140 to be stored, the encoder of the electronic device 100 may access the memory 140 to obtain the encoding parameter and may perform specific calculation for the capture image using the encoding parameter to encode the capture image. The encoder may be, for example, a joint photographic coding experts group (JPEG) encoder. The encoder may encode a capture image by a usually used way.

According to an embodiment, the electronic device 100 may encode a capture image, obtained at intervals of a time shorter than a specific time, based on the same encoding parameter. For example, if a plurality of capture images obtained by continuous capture are encoded, the electronic device 100 may analyze a first obtained capture image and may generate an encoding parameter based on the analyzed result. The electronic device 100 may apply an encoding parameter for a first obtained capture image to all capture images obtained by continuous capture.

If an encoding parameter is generated for each of a plurality of capture images obtained by continuous capture, a time required for performing encoding may be excessively increased. Also, characteristics of a plurality of images obtained by continuous capture may be similar to each other. Therefore, a time required for performing encoding may be shortened while minimizing deterioration in encoding quality, by using an encoding parameter for a capture image first obtained among a plurality of capture images obtained by continuous capture.

In operation 370, the electronic device 100 may store the encoded capture image. For one example, the electronic device 100 may store the encoded capture image in the memory 140 in the electronic device 100. For another example, the electronic device 100 may send the encoded capture image to an external module to store the encoded capture image.

Figure 4:
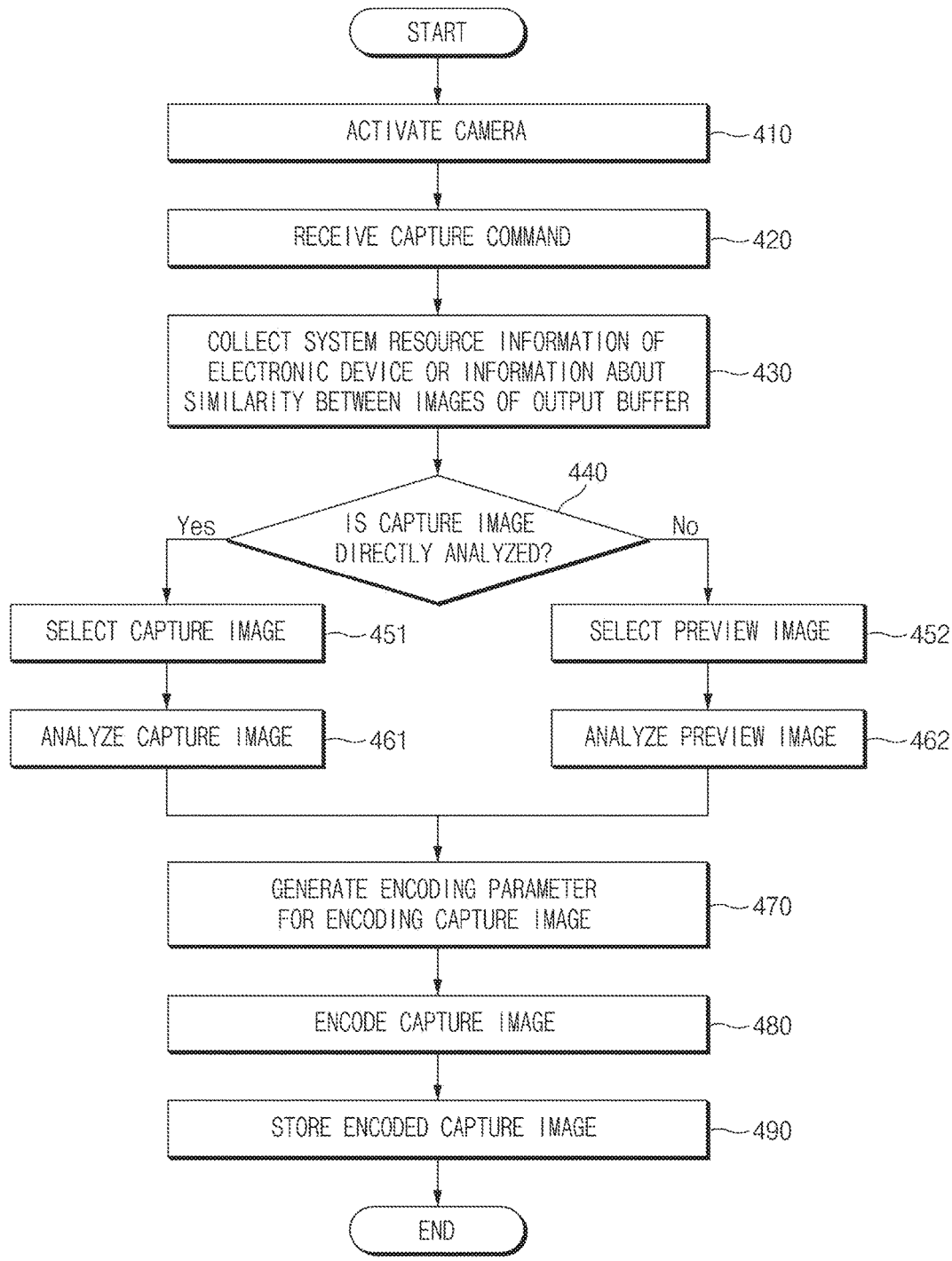
FIG. 4 is a flowchart illustrating an image encoding method of an electronic device according to an embodiment of the present disclosure.

FIG. 4 is a flowchart illustrating an image encoding method of an electronic device according to an embodiment of the present disclosure. For convenience of description, a repeated description for operations described with reference to FIG. 3 will be omitted below.

Referring to FIG. 4, in operation 410, an electronic device 100 of FIG. 1 may activate a camera module 130 of FIG. 1.

In operation 420, the electronic device 100 may receive a capture command.

In operation 430, the electronic device 100 may collect its system resource information and information about similarity between images obtained by the camera module 130. The system resource information may include, for example, performance of a processor 120 of FIG. 1, information indicating whether the electronic device 100 includes a resizer implemented with hardware, or information about a spare area of a memory 140 of FIG. 1 and the like of a memory 140 of FIG. 1. The similarity information may be calculated by applying an algorithm of determining similarity between images to images stored in an input buffer and an output buffer.

In operation 440, the electronic device 100 may determine whether to analyze a capture image or a preview image to calculate an encoding parameter.

According to an embodiment, the electronic device 100 may select a preview image, stored in the output buffer, as an image to be analyzed. For one example, if the performance of the processor 120 is lower than specific criteria and if the electronic device 100 directly analyzes a capture image, since a time required for analyzing the capture image is excessively increased, the electronic device 100 may not process the capture image in real time. Therefore, the electronic device 100 may select a preview image as the image to be analyzed. For another example, if similarity between images stored in the input buffer and the output buffer is high, although the electronic device analyzes a preview image, an encoding parameter may be optimized to a capture image to be encoded. Therefore, the electronic device 100 may select the preview image as the image to be analyzed.

According to an embodiment, the electronic device 100 may select a capture image, stored in the input buffer, as the image to be analyzed. For one example, if the performance of the processor 120 is higher than specific criteria, although the electronic device 100 analyzes a capture image, since a time required for analyzing the capture image is short, the electronic device 100 may process the capture image in real time. Therefore, the electronic device 100 may select the capture image as the image to be analyzed. For another example, if similarity between images stored in the input buffer and the output buffer is low and if the electronic device 100 analyzes a preview image and generates an encoding parameter based on the analyzed result, the encoding parameter may not be optimized to a capture image to be encoded. Therefore, the electronic device 100 may select the capture image as the image to be analyzed.

According to an embodiment, the electronic device 100 may select the most similar image to a capture image stored in the input buffer among images stored in the output buffer as the image to be analyzed. For example, the electronic device 100 may calculate similarity between a capture image stored in the input buffer and images stored in the output buffer at a time when a capture command is received. The electronic device 100 may calculate similarity using various algorithms for calculating the similarity between images. The electronic device 100 may select an image having the highest similarity among image stored in the output buffer as the image to be analyzed. If similarity between a capture image and an image to be analyzed is high, although the electronic device 100 analyzes the image to be analyzed, an encoding parameter may be optimized to a capture image to be encoded. Therefore, the electronic device 100 may select the most similar image to a capture image among images stored in the output buffer as the image to be analyzed.

In operation 451, the electronic device 100 may select the capture image as an image to be analyzed, based on the result of operation 440. The processor 120 of the electronic device 100 may select a capture image stored in the input buffer.

Alternatively, in operation 452, the electronic device 100 may select a preview image as an image to be analyzed, based on the result of operation 440. The processor 120 of the electronic device 100 may select a preview image stored in the output buffer.

If the capture image is selected as the image to be analyzed, in operation 461, the electronic device 100 may analyze the capture image. Compared with if the preview image is analyzed, if the capture image is analyzed, accuracy of the analyzed result may be improved.

Alternatively, if the preview image is selected as the image to be analyzed, in operation 462, the electronic device 100 may analyze the preview image. Compared with if the capture image is analyzed, if the preview image is analyzed, a time required for analysis may be reduced. Also, compared with if the capture image is analyzed, if the preview image is analyzed, real time may be easily obtained.

In operation 470, the electronic device 100 may generate an encoding parameter for encoding the capture image.

In operation 480, the electronic device 100 may encode the capture image based on the encoding parameter.

In operation 490, the electronic device 100 may store the encoded capture image.

Figure 5:
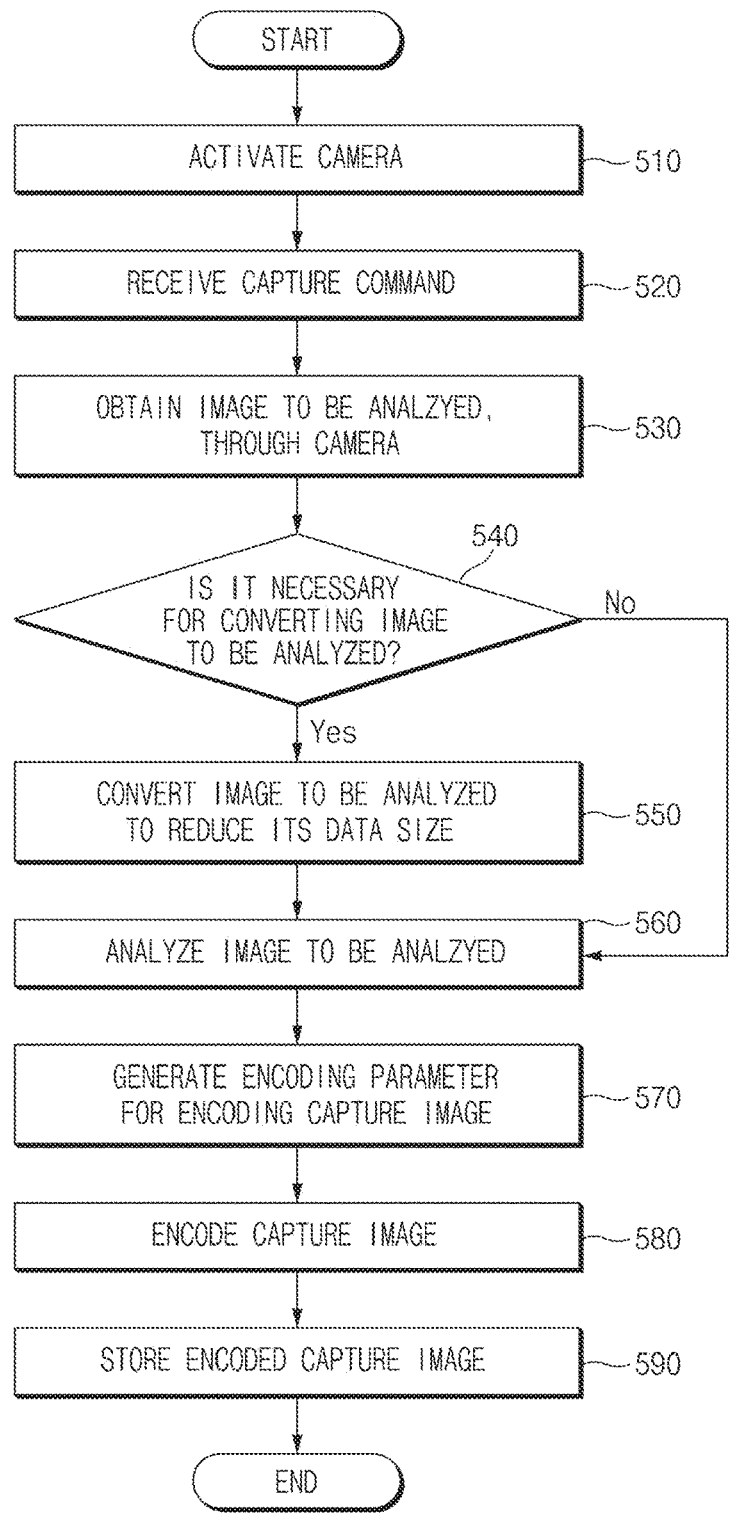
FIG. 5 is a flowchart illustrating an image encoding method of an electronic device according to an embodiment of the present disclosure.

FIG. 5 is a flowchart illustrating an image encoding method of an electronic device according to an embodiment of the present disclosure. For convenience of description, a repeated description for operations described with reference to FIG. 3 will be omitted below.

Referring to FIG. 5, in operation 510, an electronic device 100 of FIG. 1 may activate a camera module 130 of FIG. 1.

In operation 520, the electronic device 100 may receive a capture command.

In operation 530, the electronic device 100 may obtain an image to be analyzed.

In operation 540, the electronic device 100 may determine whether it is necessary for converting the image to be analyzed. If determining that a time required for analyzing the image to be analyzed is increased, the electronic device 100 may determine to convert the image to be analyzed to reduce a data size of the image to be analyzed.

According to an embodiment, to perform operation 540, the electronic device 100 may collect system resource information, for example, performance of a processor 120 of FIG. 1 or information indicating whether the electronic device 100 includes a resizer implemented with hardware. The electronic device 100 may determine whether to resize or crop the image to be analyzed, based on the system resource information. For one example, if the performance of the processor 120 is lower than specific criteria, since a time required for analyzing the image to be analyzed is increased, the electronic device 100 may determine to resize or crop the image to be analyzed to reduce a data size of the image to be analyzed. For another example, if the resizer implemented with hardware is included in the electronic device 100, compared with performing resizing through software, if performing resizing through the resizer implemented with hardware, a time required for performing resizing may be reduced. Therefore, the electronic device 100 may determine to resize the image to be analyzed using the resizer implemented with hardware to reduce a data size of the image to be analyzed. For another example, if the resizer implemented with hardware is not included in the electronic device 100 and if the performance of the processor 120 is lower than the specific criteria, the electronic device 100 may determine to resize the image to be analyzed through software.

According to an embodiment, the electronic device 100 may determine to resize or crop the image to be analyzed, based on feature information of the image to be analyzed. The feature information of the image to be analyzed may include a variety of information about the image to be analyzed, for example, resolution or an ROI. For one example, if resolution of the image to be analyzed is high, since a time required for analyzing the image to be analyzed is increased, the electronic device 100 may determine to resize the image to be analyzed to reduce a data size of the image to be analyzed. For another example, the electronic device 100 may determine to crop the other regions except for an ROI of the image to be analyzed to reduce a data size of the image to be analyzed.

According to an embodiment, the electronic device 100 may determine to crop the other regions except for a central region of the image to be analyzed. For another example, the electronic device 100 may determine to crop the other regions except for a face region in the image to be analyzed.

According to an embodiment, the electronic device 100 may determine whether to resize or crop the image to be analyzed, based on specific capture quality information. For one example, if a user of the electronic device 100 requests to capture an image of high quality, the electronic device 100 may determine not to resize or crop the image to be analyzed. For another example, if the user requests to capture an image of low quality, the electronic device 100 may determine to resize or crop the image to be analyzed.

If determining that it is necessary for converting the image to be analyzed, in operation 550, the electronic device 100 may convert the image to be analyzed to reduce a data size of the image to be analyzed. According to an embodiment, the electronic device 100 may resize or crop the image to be analyzed. According to an embodiment, the image to be analyzed may be resized by the resizer implemented with hardware.

As shown in FIG. 5, operation 550 may be omitted based on result of operation 540.

In operation 560, the electronic device 100 may analyze the image to be analyzed, resized or cropped in operation 540. A time required for analysis may be reduced by analyzing the resized or cropped image.

In operation 570, the electronic device 100 may generate an encoding parameter for encoding the capture image.

In operation 580, the electronic device 100 may encode the capture image based on the encoding parameter.

In operation 590, the electronic device 100 may store the encoded capture image.

Figure 6:
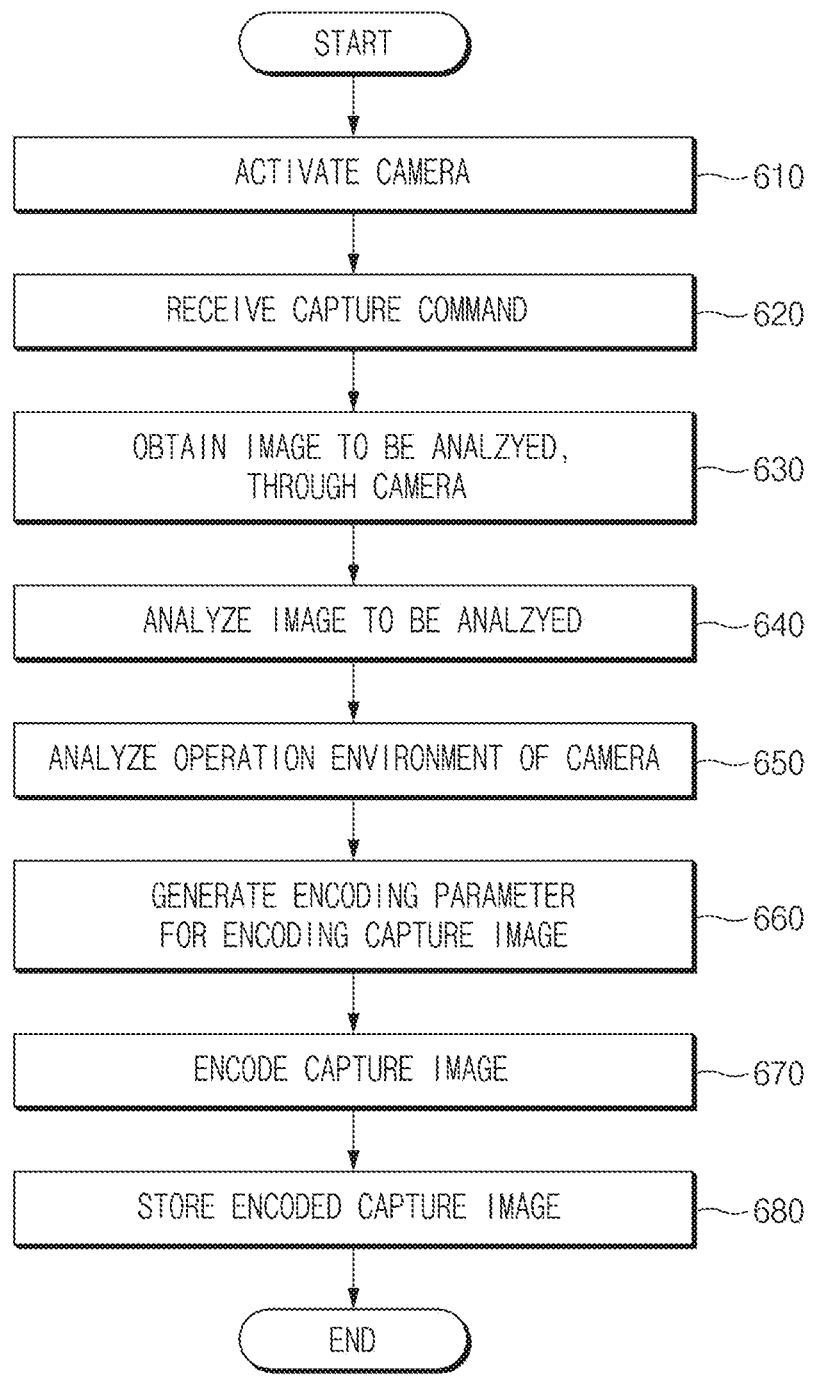
FIG. 6 is a flowchart illustrating an image encoding method of an electronic device according to an embodiment of the present disclosure.

FIG. 6 is a flowchart illustrating an image encoding method of an electronic device according to an embodiment of the present disclosure. For convenience of description, a repeated description for operations described with reference to FIG. 3 will be omitted below.

Referring to FIG. 6, in operation 610, an electronic device 100 of FIG. 1 may activate a camera module 130 of FIG. 1.

In operation 620, the electronic device 100 may receive a capture command.

In operation 630, the electronic device 100 may obtain an image to be analyzed.

In operation 640, the electronic device 100 may analyze the image to be analyzed.

In operation 650, the electronic device 100 may analyze an operation environment of the camera module 130. The electronic device 100 may analyze the operation environment to optimize an encoding parameter to the operation environment of the camera module 130. For example, the electronic device 100 may analyze an operation environment, for example, whether the camera module 130 is activated through an SNS application or a messenger application or a spare area of a memory 140 of FIG. 1 when the camera module 130 is activated.

In operation 660, the electronic device 100 may generate an encoding parameter for encoding a capture image, based on the operation environment of the camera module 130, analyzed in operation 650. For one example, under an operation environment in which the camera module 130 is activated through the SNS application or the messenger application, the electronic device 100 may generate an encoding parameter for providing a high compressibility. For another example, under an operation environment in which a spare area of the memory 140 is small, the electronic device 100 may generate an encoding parameter for providing a high compressibility.

In operation 670, the electronic device 100 may encode the capture image based on the encoding parameter.

In operation 680, the electronic device 100 may store the encoded capture image.

Figure 7:
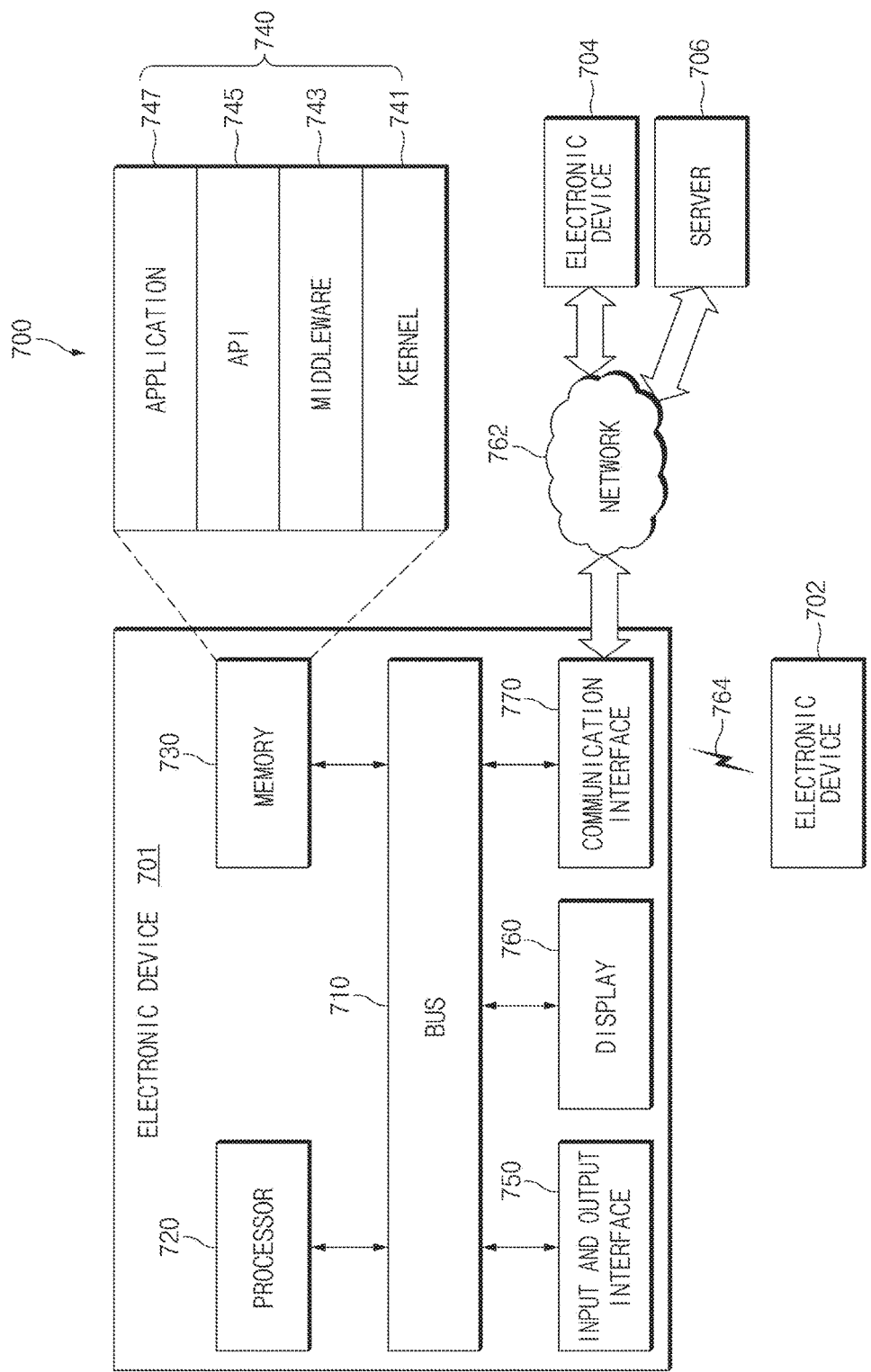
FIG. 7 is a block diagram illustrating a configuration of an electronic device in a network environment according to an embodiment of the present disclosure.

FIG. 7 is a block diagram illustrating a configuration of an electronic device in a network environment according to various embodiments of the present disclosure.

Referring to FIG. 7, in various embodiments, a system 700 may include an electronic device 701 and a first external electronic device 702, a second external electronic device 704, or a server 706, which may connect with each other over a network 762 or local-area communication network 764. The electronic device 701 may include a bus 710, a processor 720, a memory 730, an input and output interface 750, a display 760, and a communication interface 770. In various embodiments, at least one of the components may be omitted from the electronic device 701, or other components may be additionally included in the electronic device 701.

The bus 710 may be, for example, a circuit which connects the components 720 to 770 with each other and transmits a communication signal (e.g., a control message and/or data) between the components.

The processor 720 may include one or more of a CPU, an AP, or a communication processor (CP). For example, the processor 720 may perform calculation or data processing about control and/or communication of at least another of the components of the electronic device 701.

The memory 730 may include a volatile and/or non-volatile memory. The memory 730 may store, for example, a command or data associated with at least another of the components of the electronic device 701. According to an embodiment, the memory 730 may be software and/or a program 740. The program 740 may include, for example, a kernel 741, a middleware 743, an application programming interface (API) 745, and/or an least one application program 747 (or "at least one application"), and the like. At least part of the kernel 741, the middleware 743, or the API 745 may be referred to as an operating system (OS).

The kernel 741 may control or manage, for example, system resources (e.g., the bus 710, the processor 720, or the memory 730, and the like) used to execute an operation or function implemented in the other programs (e.g., the middleware 743, the API 745, or the application program 747). Also, as the middleware 743, the API 745, or the application program 747 accesses a separate component of the electronic device 701, the kernel 741 may provide an interface which may control or manage system resources.

The middleware 743 may play a role as, for example, a go-between such that the API 745 or the application program 747 communicates with the kernel 741 to communicate data.

Also, the middleware 743 may process one or more work requests, received from the at least one application program 747, in order of priority. For example, the middleware 743 may assign priority which may use system resources (the bus 710, the processor 720, or the memory 730, and the like) of the electronic device 701 to at least one of the at least one application program 747. For example, the middleware 743 may perform scheduling or load balancing for the one or more work requests by processing the one or more work requests in order of the priority assigned to the at least one of the at least one application program 747.

The API 745 may be, for example, an interface in which the application program 747 controls a function provided from the kernel 741 or the middleware 743. For example, the API 745 may include at least one interface or function (e.g., a command) for file control, window control, image processing, or text control, and the like.

The input and output interface 750 may play a role as, for example, an interface which may transmit a command or data input from a user or another external device to another component (or other components) of the electronic device 701. Also, input and output interface 750 may output a command or data received from another component (or other components) of the electronic device 701 to the user or the other external device.

The display 760 may include, for example, a liquid crystal display (LCD), a light emitting diode (LED) display, an organic LED (OLED) display, a microelectromechanical systems (MEMS) display, or an electronic paper display. The display 1360 may display, for example, a variety of content (e.g., text, images, videos, icons, or symbols, and the like) to the user. The display 760 may include a touch screen, and may receive, for example, touch, gesture, proximity, or a hovering input using an electronic pen or part of a body of the user.

The communication interface 770 may establish communication between, for example, the electronic device 701 and an external device (e.g., a first external electronic device 702, a second external electronic device 704, or a server 706). For example, the communication interface 770 may connect to a network 762 through wireless communication or wired communication and may communicate with the external device (e.g., the second external electronic device 704 or the server 706).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, the local-area communication network 764. The local-area communication network 764 may include, for example, at least one of Wi-Fi communication, Bluetooth (BT) communication, near field communication (NFC) communication, magnetic stripe transmission (MST) communication, or GNSS communication, and the like.

An MST module may generate a pulse based on transmission data using an electromagnetic signal and may generate a magnetic field signal based on the pulse. The electronic device 701 may send the magnetic field signal to a POS system. The POS system may restore the data by detecting the magnetic field signal using an MST reader and converting the detected magnetic field signal into an electric signal.

The GNSS may include, for example, at least one of a global positioning system (GPS), a GLONASS, a BeiDou navigation satellite system (hereinafter referred to as "Beidou"), or a Galileo (i.e., the European global satellite-based navigation system) according to an available area or a bandwidth, and the like. Hereinafter, the "GPS" used herein may be interchangeably with the "GNSS". The wired communication may include at least one of, for example, universal serial bus (USB) communication, high definition multimedia interface (HDMI) communication, recommended standard 232 (RS-232) communication, or plain old telephone service (POTS) communication, and the like. The network 762 may include a telecommunications network, for example, at least one of a computer network (e.g., a local area network (LAN) or a wide area network (WAN)), the internet, or a telephone network.

Each of the first and second external electronic devices 702 and 704 may be the same as or different device from the electronic device 701. According to an embodiment, the server 706 may include a group of one or more servers. According to various embodiments, all or some of operations executed in the electronic device 701 may be executed in another electronic device or a plurality of electronic devices (e.g., the first external electronic device 702, the second external electronic device 704, or the server 706). According to an embodiment, if the electronic device 701 should perform any function or service automatically or according to a request, it may request another device (e.g., the first external electronic device 702, the second external electronic device 704, or the server 706) to perform at least part of the function or service, rather than executing the function or service for itself or in addition to the function or service. The other electronic device (e.g., the first external electronic device 702, the second external electronic device 704, or the server 706) may execute the requested function or the added function and may transmit the executed result to the electronic device 701. The electronic device 701 may process the received result without change or additionally and may provide the requested function or service. For this purpose, for example, cloud computing technologies, distributed computing technologies, or client-server computing technologies may be used.

Figure 8:
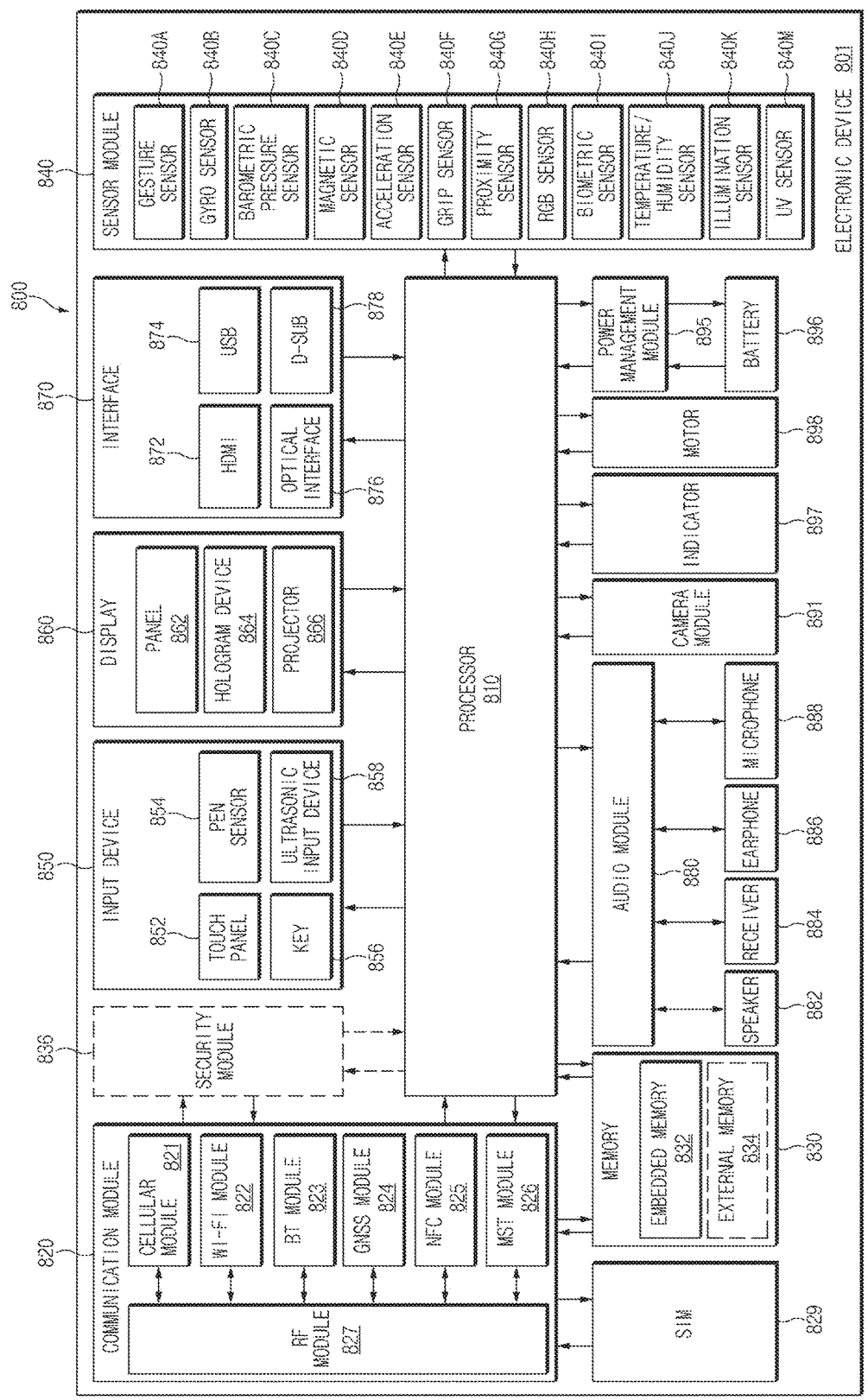
FIG. 8 is a block diagram illustrating a configuration of an electronic device according to an embodiment of the present disclosure.

FIG. 8 is a block diagram 800 illustrating a configuration of an electronic device 801 according to various embodiments of the present disclosure.

Referring to FIG. 8, the electronic device 801 may include, for example, all or part of an electronic device 701 shown in FIG. 7. The electronic device 801 may include one or more processors 810 (e.g., APs), a communication module 820, a subscriber identification module (SIM) 829, a memory 830, a secure module 836, a sensor module 840, an input device 850, a display 860, an interface 870, an audio module 880, a camera module 891, a power management module 895, a battery 896, an indicator 897, and a motor 898.

The processor 810 may drive, for example, an OS or an application program to control a plurality of hardware or software components connected thereto and may process and compute a variety of data. The processor 810 may be implemented with, for example, an SoC. According to an embodiment, the processor 810 may include a GPU (not shown) and/or an ISP (not shown). The processor 810 may include at least some (e.g., a cellular module 821) of the components shown in FIG. 8. The processor 810 may load a command or data received from at least one of other components (e.g., a non-volatile memory) into a volatile memory to process the data and may store various data in a non-volatile memory.

The communication module 820 may have the same or similar configuration to a communication interface 770 of FIG. 7. The communication module 820 may include, for example, the cellular module 821, a Wi-Fi module 822, a BT module 823, a GNSS module 824 (e.g., a GPS module, a GLONASS module, a BeiDou module, or a Galileo module), an NFC module 825, an MST module 826, and a radio frequency (RF) module 827.

The cellular module 821 may provide, for example, a voice call service, a video call service, a text message service, or an Internet service, and the like through a communication network. According to an embodiment, the cellular module 821 may identify and authenticate the electronic device 801 in a communication network using the SIM 829 (e.g., a SIM card). According to an embodiment, the cellular module 821 may perform at least part of functions which may be provided by the processor 810. According to an embodiment, the cellular module 821 may include a CP.

The Wi-Fi module 822, the BT module 823, the GNSS module 824, the NFC module 825, or the MST module 826 may include, for example, a processor for processing data transmitted and received through the corresponding module. According to various embodiments, at least some (e.g., two or more) of the cellular module 821, the Wi-Fi module 822, the BT module 823, the GNSS module 824, the NFC module 825, or the MST module 826 may be included in one integrated chip (IC) or one IC package.

The RF module 827 may transmit and receive, for example, a communication signal (e.g., an RF signal). Though not shown, the RF module 827 may include, for example, a transceiver, a power amplifier module (PAM), a frequency filter, or a low noise amplifier (LNA), or an antenna, and the like. According to an embodiment, at least one of the cellular module 821, the Wi-Fi module 822, the BT module 823, the GNSS module 824, the NFC module 825, or the MST module 826 may transmit and receive an RF signal through a separate RF module.

The SIM 829 may include, for example, a card which includes a SIM and/or an embedded SIM. The SIM 829 may include unique identification information (e.g., an integrated circuit card identifier (ICCID)) or subscriber information (e.g., an international mobile subscriber identity (IMSI)).

The memory 830 (e.g., a memory 730 of FIG. 7) may include, for example, an embedded memory 832 or an external memory 834. The embedded memory 832 may include at least one of, for example, a volatile memory (e.g., a dynamic RAM (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 834 may include a flash drive, for example, a compact flash (CF), a secure digital (SD), a micro-SD, a mini-SD, an extreme digital (xD), a multimedia card (MMC), or a memory stick, and the like. The external memory 834 may operatively and/or physically connect with the electronic device 801 through various interfaces.

The secure module 836 may be a module which has a relatively higher secure level than the memory 830 and may be a circuit which stores secure data and guarantees a protected execution environment. The secure module 836 may be implemented with a separate circuit and may include a separate processor. The secure module 836 may include, for example, an embedded secure element (eSE) which is present in a removable smart chip or a removable SD card or is embedded in a fixed chip of the electronic device 801. Also, the secure module 836 may be driven by an OS different from the OS of the electronic device 801. For example, the secure module 836 may operate based on a java card open platform (JCOP) OS.

The sensor module 840 may measure, for example, a physical quantity or may detect an operation state of the electronic device 801, and may convert the measured or detected information to an electric signal. The sensor module 840 may include at least one of, for example, a gesture sensor 840A, a gyro sensor 840B, a barometric pressure sensor 840C, a magnetic sensor 840D, an acceleration sensor 840E, a grip sensor 840F, a proximity sensor 840G, a color sensor 840H (e.g., red, green, blue (RGB) sensor), a biometric sensor 840I, a temperature/humidity sensor 840J, an illumination sensor 840K, or an ultraviolet (UV) sensor 840M. Additionally or alternatively, the sensor module 840 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 840 may further include a control circuit for controlling at least one or more sensors included therein. According to various embodiments, the electronic device 801 may further include a processor configured to control the sensor module 840, as part of the processor 810 or to be independent of the processor 810. While the processor 810 is in a sleep state, the electronic device 801 may control the sensor module 840.

The input device 850 may include, for example, a touch panel 852, a (digital) pen sensor 854, a key 856, or an ultrasonic input unit 858. The touch panel 852 may use at least one of, for example, a capacitive type, a resistive type, an IR type, or an ultrasonic type. Also, the touch panel 852 may include a control circuit. The touch panel 852 may further include a tactile layer and may provide a tactile reaction to a user.

The (digital) pen sensor 854 may be, for example, part of the touch panel 852 or may include a separate sheet for recognition. The key 856 may include, for example, a physical button, an optical key, or a keypad. The ultrasonic input unit 858 may allow the electronic device 801 to detect a sound wave using a microphone (e.g., a microphone 888) and to verify data through an input tool generating an ultrasonic signal.

The display 860 (e.g., a display 760 of FIG. 7) may include a panel 862, a hologram device 864, or a projector 866. The panel 862 may include the same or similar configuration to the display 760. The panel 862 may be implemented to be, for example, flexible, transparent, or wearable. The panel 862 and the touch panel 852 may be integrated into one module. The hologram device 864 may show a stereoscopic image in a space using interference of light. The projector 866 may project light onto a screen to display an image. The screen may be positioned, for example, inside or outside the electronic device 801. According to an embodiment, the display 860 may further include a control circuit for controlling the panel 862, the hologram device 864, or the projector 866.

The interface 870 may include, for example, a high-definition multimedia interface (HDMI) 872, a USB 874, an optical interface 876, or a D-subminiature 878. The interface 870 may be included in, for example, a communication interface 770 shown in FIG. 7. Additionally or alternatively, the interface 870 may include, for example, a mobile high definition link (MHL) interface, an SD card/MMC interface, or an infrared data association (IrDA) standard interface.

The audio module 880 may interchangeably convert a sound into an electric signal. At least part of components of the audio module 880 may be included in, for example, an input and output interface 750 shown in FIG. 7. The audio module 880 may process sound information input or output through, for example, a speaker 882, a receiver 884, an earphone 886, or the microphone 888, and the like.

The camera module 891 may be a device which captures a still image and a moving image. According to an embodiment, the camera module 891 may include one or more image sensors (not shown) (e.g., a front sensor or a rear sensor), a lens (not shown), an ISP (not shown), or a flash (not shown) (e.g., an LED or a xenon lamp).

The power management module 895 may manage, for example, power of the electronic device 801. According to an embodiment, though not shown, the power management module 895 may include a power management IC (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 896 and voltage, current, or temperature thereof while the battery 896 is charged. The battery 896 may include, for example, a rechargeable battery or a solar battery.

The indicator 897 may display a specific state of the electronic device 801 or part (e.g., the processor 810) thereof, for example, a booting state, a message state, or a charging state, and the like. The motor 898 may convert an electric signal into mechanical vibration and may generate vibration or a haptic effect, and the like. Though not shown, the electronic device 801 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 9:
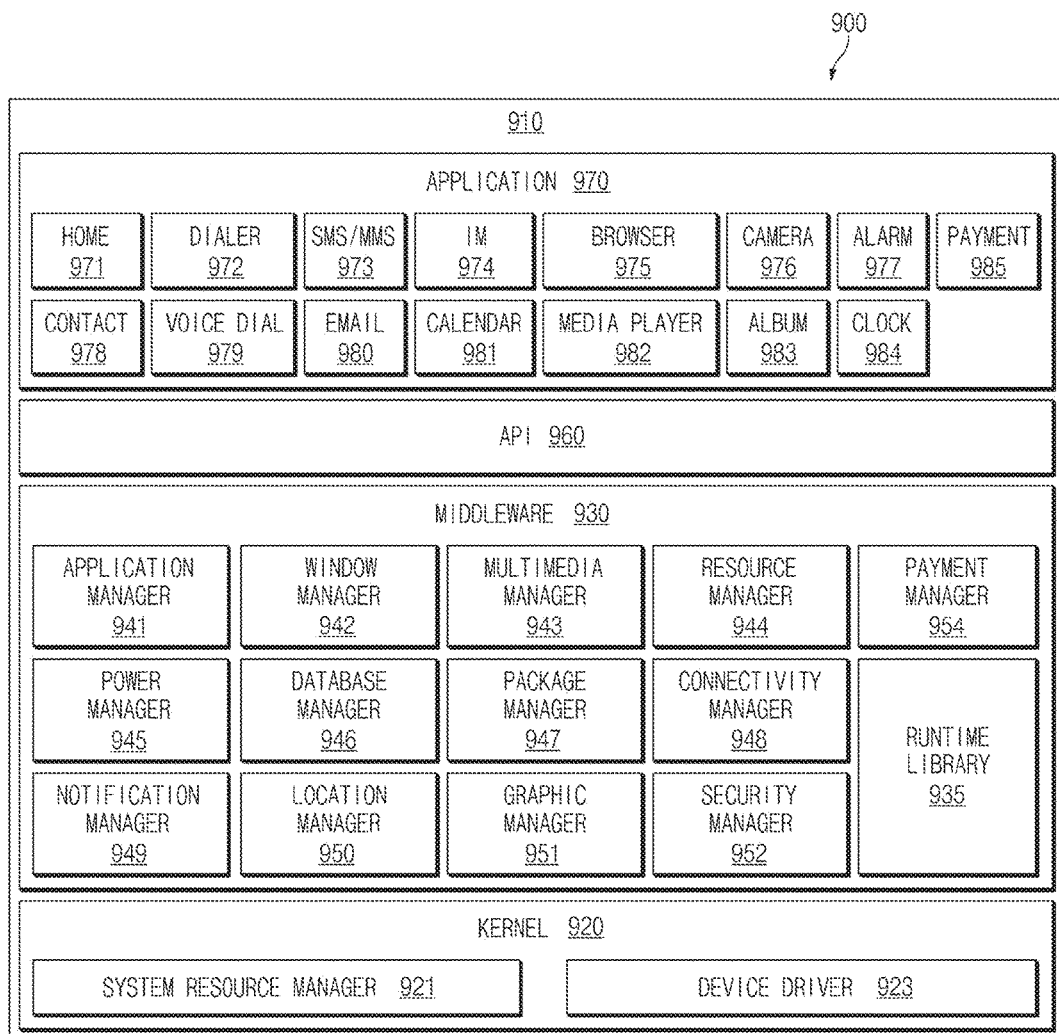
FIG. 9 is a block diagram illustrating a configuration of a program module according to an embodiment of the present disclosure.

FIG. 9 is a block diagram 900 illustrating a configuration of a program module according to various embodiments of the present disclosure.

According to an embodiment, the program module 910 (e.g., a program 740 of FIG. 7) may include an OS for controlling resources associated with an electronic device (e.g., an electronic device 701 of FIG. 7) and/or various applications (e.g., at least one application program 747 of FIG. 7) which are executed on the OS. The OS may be, for example, Android, iOS, Windows, Symbian, Tizen, or Bada, and the like.

The program module 910 may include a kernel 920, a middleware 930, an API 960, and/or at least one application 970. At least part of the program module 910 may be preloaded on the electronic device, or may be downloaded from an external electronic device (e.g., a first external electronic device 702, a second external electronic device 704, or a server 706, and the like of FIG. 7).

The kernel 920 (e.g., a kernel 741 of FIG. 7) may include, for example, a system resource manager 921 and/or a device driver 923. The system resource manager 921 may control, assign, or collect, and the like system resources. According to an embodiment, the system resource manager 921 may include a process management unit, a memory management unit, or a file system management unit, and the like. The device driver 923 may include, for example, a display driver, a camera driver, a BT driver, a shared memory driver, a USB driver, a keypad driver, a Wi-Fi driver, an audio driver, or an inter-process communication (IPC) driver.

The middleware 930 (e.g., a middleware 743 of FIG. 7) may provide, for example, functions the application 970 needs in common, and may provide various functions to the application 970 through the API 960 such that the application 970 efficiently uses limited system resources in the electronic device. According to an embodiment, the middleware 930 (e.g., the middleware 743) may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, a security manager 952, or a payment manager 954.

The runtime library 935 may include, for example, a library module used by a compiler to add a new function through a programming language while the application 970 is executed. The runtime library 935 may perform a function about input and output management, memory management, or an arithmetic function.

The application manager 941 may manage, for example, a life cycle of at least one of the at least one application 970. The window manager 942 may manage graphic UI (GUI) resources used on a screen of the electronic device. The multimedia manager 943 may determine a format necessary for reproducing various media files and may encode or decode a media file using a codec corresponding to the corresponding format. The resource manager 944 may manage source codes of at least one of the at least one application 970, and may manage resources of a memory or a storage space, and the like.

The power manager 945 may act together with, for example, a basic input/output system (BIOS) and the like, may manage a battery or a power source, and may provide power information necessary for an operation of the electronic device. The database manager 946 may generate, search, or change a database to be used in at least one of the at least one application 970. The package manager 947 may manage installation or update of an application distributed by a type of a package file.

The connectivity manager 948 may manage, for example, wireless connection such as Wi-Fi connection or BT connection, and the like. The notification manager 949 may display or notify events, such as an arrival message, an appointment, and proximity notification, by a method which is not disturbed to the user. The location manager 950 may manage location information of the electronic device. The graphic manager 951 may manage a graphic effect to be provided to the user or a UI related to the graphic effect. The security manager 952 may provide all security functions necessary for system security or user authentication, and the like. According to an embodiment, when the electronic device (e.g., the electronic device 701) has a phone function, the middleware 930 may further include a telephony manager (not shown) for managing a voice or video communication function of the electronic device.

The middleware 930 may include a middleware module which configures combinations of various functions of the above-described components. The middleware 930 may provide a module which specializes according to kinds of OSs to provide a differentiated function. Also, the middleware 930 may dynamically delete some of old components or may add new components.

The API 960 (e.g., an API 745 of FIG. 7) may be, for example, a set of API programming functions, and may be provided with different components according to OS s. For example, in case of Android or iOS, one API set may be provided according to platforms. In case of Tizen, two or more API sets may be provided according to platforms.

The application 970 (e.g., the application program 747) may include one or more of, for example, a home application 971, a dialer application 972, a short message service (SMS)/multimedia message service (MMS) application 973, an instant message (IM) application 974, a browser application 975, a camera application 976, an alarm application 977, a contact application 978, a voice dial application 979, an e-mail application 980, a calendar application 981, a media player application 982, an album application 983, a clock application 984, a payment application 985, a health care application (e.g., an application for measuring quantity of exercise or blood sugar, and the like), or an environment information application (e.g., an application for providing atmospheric pressure information, humidity information, or temperature information, and the like), and the like.

According to an embodiment, the application 970 may include an application (hereinafter, for better understanding and ease of description, referred to as "information exchange application") for exchanging information between the electronic device (e.g., the electronic device 701) and an external electronic device (e.g., the first external electronic device 702 or the second external electronic device 704). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 702 or the second external electronic device 704). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 702 or the second external electronic device 704) which communicates with the electronic device, an application which operates in the external electronic device, or a service (e.g., a call service or a message service) provided from the external electronic device.

According to an embodiment, the application 970 may include an application (e.g., the health card application of a mobile medical device) which is preset according to attributes of the external electronic device (e.g., the first external electronic device 702 or the second external electronic device 704). According to an embodiment, the application 970 may include an application received from the external electronic device (e.g., the server 706, the first external electronic device 702, or the second external electronic device 704). According to an embodiment, the application 970 may include a preloaded application or a third party application which may be downloaded from a server. Names of the components of the program module 910 according to various embodiments of the present disclosure may differ according to kinds of OSs.

According to various embodiments, at least part of the program module 910 may be implemented with software, firmware, hardware, or at least two or more combinations thereof. At least part of the program module 910 may be implemented (e.g., executed) by, for example, a processor (e.g., a processor 810 of FIG. 8). At least part of the program module 910 may include, for example, a module, a program, a routine, sets of instructions, or a process, and the like for performing one or more functions.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific IC (ASIC) chip, field-programmable gate arrays (FPGAs), or a programmable-logic device, which is well known or will be developed in the future, for performing certain operations.

According to various embodiments of the present disclosure, at least part of a device (e.g., modules or the functions) or a method (e.g., operations) may be implemented with, for example, instructions stored in computer-readable storage media which have a program module. When the instructions are executed by a processor, one or more processors may perform functions corresponding to the instructions. The computer-readable storage media may be, for example, a memory.

The computer-readable storage media may include a hard disc, a floppy disk, magnetic media (e.g., a magnetic tape), optical media (e.g., a compact disc ROM (CD-ROM) and a DVD), magneto-optical media (e.g., a floptical disk), a hardware device (e.g., a ROM, a RAM, or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

Instructions stored in a computer-readable recording medium according to an embodiment of the present disclosure may be set to generate an encoding parameter based on a characteristic of an encoder receiving the encoding parameter and to provide the encoding parameter to the encoder. The electronic device according to an embodiment of the present disclosure may be configured to operate as one or more software modules to perform an operation based on the instructions.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

According to embodiments disclosed in the present disclosure, the electronic device may increase the compression efficiency of the image by generating the encoding parameter optimized to the image to be encoded. Also, the electronic device may enhance the operation efficiency of the encoder by providing the encoding parameter to the encoder in consideration of the encoding scheme of the encoder.

While the present disclosure has been shown and describe with reference to various embodiments thereof, it will be understood by those skilled in the art that various changes in form and details may be made therein without departing from the spirit and scope of the present disclosure as defined in the appended claims and their equivalents.

What is claimed is:

1. An electronic device, comprising:
a display;
a camera configured to obtain an image;
an input buffer configured to store a capture image obtained from the image;
an output buffer configured to store a preview image obtained from the capture image;
a hardware encoder configured to encode the capture image output from the input buffer;
at least one memory; and
a processor configured to electrically connect with the camera and the at least one memory,
wherein the processor is configured to:
analyze a target image which is the capture image or the preview image, in response to receiving a capture command,
generate an encoding parameter for the target image based on the analyzed result, the encoding parameter associated with a compression ratio, and
provide the encoding parameter to the hardware encoder,
wherein the processor is further configured to select one of the capture image or the preview image as the target image, in response to receiving the capture command,
wherein the capture image is an image stored in the input buffer at a time when the capture command for the camera is received,
wherein the preview image is an image stored in the output buffer at the time when the capture command for the camera is received and is an image displayed through the display when the camera is activated,
wherein the hardware encoder is configured to encode the capture image using the encoding parameter, and
wherein the preview image may be smaller in data size than the capture image.

2. The electronic device of claim 1, wherein the processor is further configured to:
store the capture image encoded by the encoder in the at least one memory.

3. The electronic device of claim 1, wherein the processor comprises at least one of the input buffer, the output buffer or the hardware encoder.

4. The electronic device of claim 1,
wherein the processor is further configured to generate the encoding parameter based on a characteristic of the hardware encoder and the analyzed result, and
wherein the characteristic of the hardware encoder is determined based on a structure of an encoding parameter which the hardware encoder is implemented to receive.

5. The electronic device of claim 1, wherein the processor is further configured to generate the encoding parameter comprising at least one of a quality factor, a quantization table or a quantization parameter for encoding.

6. The electronic device of claim 1, wherein the processor is further configured to:
collect system resource information about the electronic device, and
determine the target image between the capture image and the preview image, based on the system resource information.

7. The electronic device of claim 1, wherein the processor is further configured to determine the target image, based on similarity between the capture image and the preview image.

8. The electronic device of claim 1, wherein the processor is further configured to resize or crop the target image to reduce a data size of the target image, based on feature information of the target image.

9. The electronic device of claim 1, wherein the processor is further configured to resize or crop the target image to reduce a data size of the target image, based on capture quality information.

10. The electronic device of claim 1, wherein the processor is further configured to generate the encoding parameter based on an operation environment of the camera.

11. The electronic device of claim 1, wherein the processor is further configured to analyze the target image, based on a previously stored visual recognition model.

12. The electronic device of claim 1, wherein the processor is further configured to:
determine a structure of the encoding parameter based on the characteristic of the hardware encoder.

13. The electronic device of claim 1, wherein the processor is further configured to determine the encoding parameter from a previously stored encoding parameter set based on the analyzed result.

14. The electronic device of claim 1, wherein the processor is further configured to:
divide the target image, and
simultaneously analyze the divided images using a plurality of cores if the processor includes the plurality of cores.

15. An electronic device comprising:
a display;
a camera configured to obtain an image;
a processor including an input buffer configured to store a capture image obtained from the image and an output buffer configured to store a preview image obtained from the capture image; and
a hardware encoder configured to encode the capture image output from the input buffer,
wherein the processor is configured to:
analyze a target image which is the capture image or the preview image, in response to receiving a capture command,
generate an encoding parameter for the target image based on the analyzed result, the encoding parameter associated with a compression ratio, and
provide the encoding parameter to the hardware encoder,
wherein the processor is further configured to select one of the capture image or the preview image as the target image, in response to receiving the capture command,
wherein the capture image is an image stored in the input buffer at a time when the capture command for the camera is received,
wherein the preview image is an image stored in the output buffer at the time when the capture command for the camera is received and is an image displayed through the display when the camera is activated,
wherein the hardware encoder is configured to encode the capture image using the encoding parameter, and
wherein the preview image may be smaller in data size than the capture image.

* * * * *